Patented Apr. 21, 1953

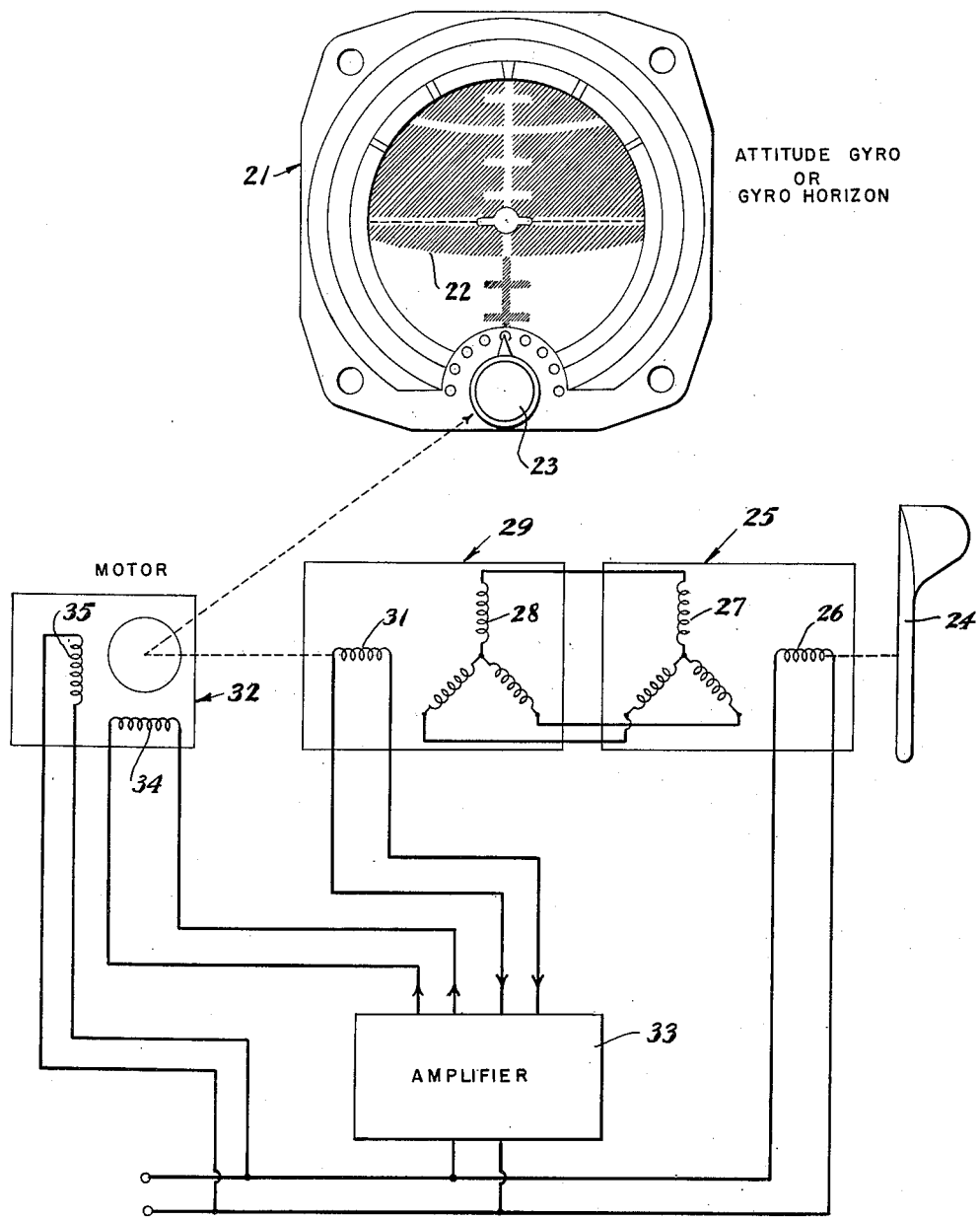

2,635,467

UNITED STATES PATENT OFFICE 2,635,467

DIVE ANGLE INDICATOR FOR AIRCRAFT

John H. Andresen, Jr., Port Washington, N. Y., assignor, by mesne assignments, to Kollsman Instrument Corporation, Elmhurst, N. Y., a corporation of New York Application July 23, 1947, Serial No. 762,957

8 Claims. (Cl. 73—178)

This invention relates to a dive angle indicator for aircraft for indicating to the pilot the angle between the flight path of the aircraft and the horizontal. This dive angle indication is useful to the pilot not only in formalized flight procedures, but also in maintaining level flight during severe air turbulence without over controlling in pitch.

An object of the invention is the provision of a dive angle indicator for aircraft in which the fore and aft attitude of the aircraft is algebraically added to its angle of attack to indicate the angle between the flight path of the aircraft and the horizontal.

Another object of the invention is the provision of a dive angle indicator for aircraft in which the response of a gyro-stabilized vertical is algebraically added to the response of an angle of attack vane to indicate the angle between the flight path of the aircraft and the horizontal.

Other objects and features of the invention will be readily apparent to those skilled in the art from the specification and appended drawings illustrating certain preferred embodiments in which:

Figure 2 is a schematic representation of a dive angle indicator using a conventional attitude gyro or gyro horizon.

Figure 1:
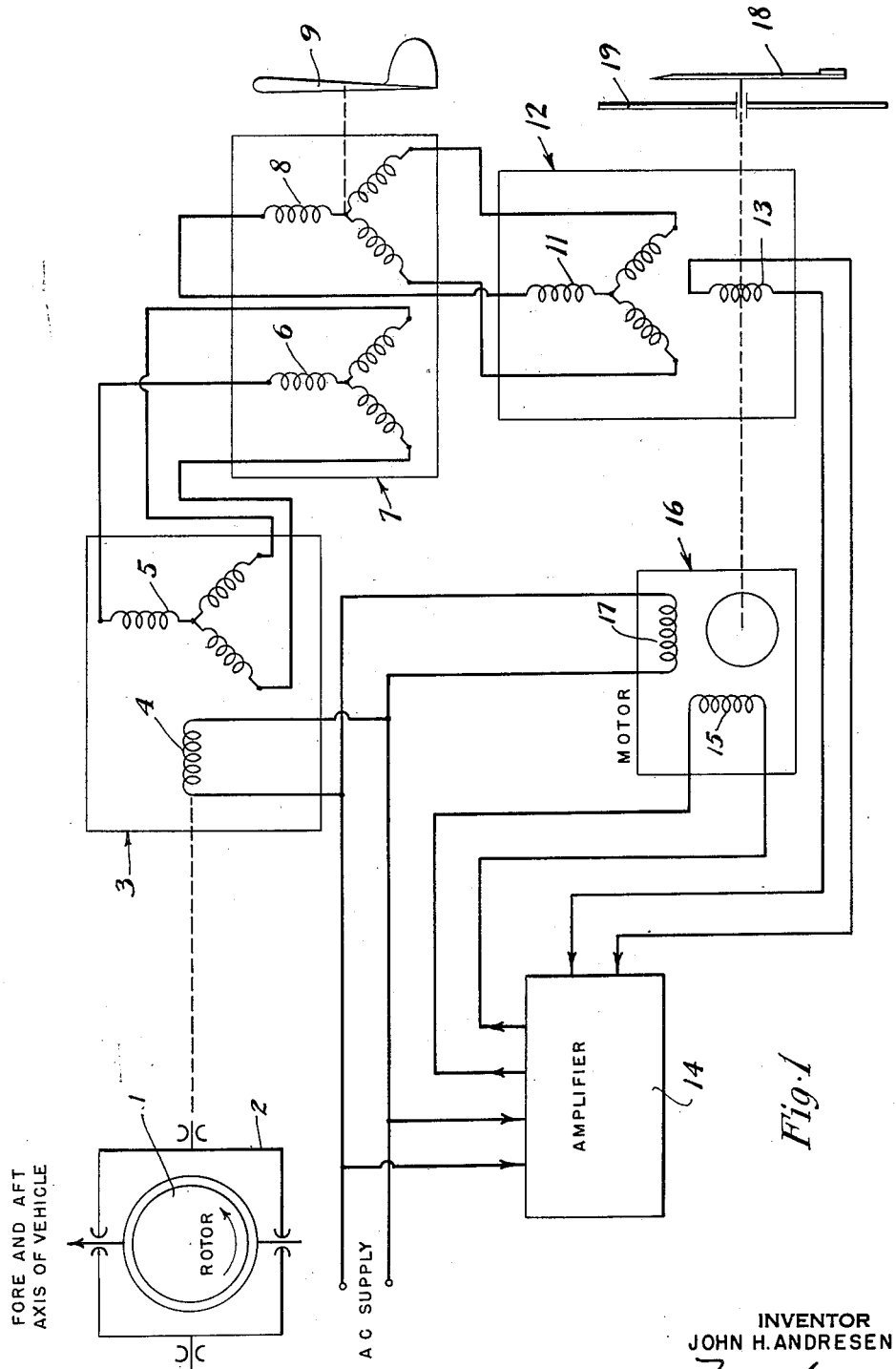
Figure 1 is a schematic representation of a dive angle indicator according to the present invention.

In the device illustrated in Figure 1 of the drawing, there is indicated a gyroscopic rotor 1 adapted to rotate about a vertical axis and provided with conventional gimbal mounting within the frame 2 mechanically connected to the rotor of a rotary transformer of the self-synchronous transmitter-receiver type, indicated generally at 3, with the rotor winding shown at 4. The three-phase stationary winding 5 of the transformer 3 is connected to a three-phase stator winding 6 of a rotary transformer indicated generally at 7 and having a three-phase rotor winding 8, the rotor of which is mechanically coupled to an angle of attack vane 9. The output of the winding 8 is fed to the three-phase winding 11 of a rotary transformer of the self-synchronous transmitter-receiver type, indicated generally at 12. The output of the single phase rotor winding 13 of the transformer 12 is fed through an amplifier 14 to one phase 15 of a motor 16, the second phase 17 of which is fed from the supply. The rotor of the motor 16 is mechanically coupled to the rotor of the transformer 12 and to a pointer 18 which cooperates with indicia on a dial 19 to indicate the dive angle of the aircraft.

In the operation of the instrument, the voltage induced in rotor winding 13 will depend in value and direction on the physical spacing of the rotor winding at opposite sides of a null point determined by the energization of the three-phase stator winding 11. At the null point, no voltage is generated in the coil 13 and the motor 16 will not operate. As the null point moves to opposite sides of the rotor position, voltages will be induced in the coil 13 to energize motor 16 for rotation in the direction determined by the induced voltage to return the rotor winding 13 back to the null point. This rotation of the rotor winding 13 will also rotate pointer 18 to indicate on the dial 19 the dive angle of aircraft.

The location of the null point in transformer 12 is determined by the energization of the three-phase stator winding 11 which is determined by the output of the rotor winding 8 of rotary transformer 7. The output of the rotor winding 8 is in turn determined by the energization of the stator winding 6 and the physical position of the rotor winding 8. The physical position of the rotor winding 8 is directly determined by the vane 9 which is responsive to angle of attack as it is disposed in the free air stream past the aircraft so that it assumes a position parallel to the flight path. The energization of the stator winding 6 of rotary transformer 7 is determined by the output of the stator winding 5 of the rotary transformer 3 which output in turn is determined by the physical position of the rotor winding 4. The rotor winding 4 is mechanically coupled to the frame 2 so that its position is determined by the gyroscopic vertical and varies with change in the fore and aft attitude of the aircraft.

The end result of the rotary transformer 7 is to algebraically add the fore and aft attitude or pitch angle of the aircraft to the angle of attack of the aircraft to produce an energization of the rotary transformer 12 which is responsive to the dive angle of the aircraft. As the energization of the stator winding 11 of transformer 12 changes, the null point changes to induce a voltage in the rotor winding 13 to energize motor 16 in the proper direction to return rotor winding 13 to the new null point. This motor rotation also rotates pointer 18 to indicate the new dive angle corresponding to the change in energization of transformer 12.

In the instrument shown in Figure 2, the indication of dive angle has been applied to a conventional attitude gyro or gyro horizon. The attitude gyro or gyro horizon, being a standard instrument, has been shown in elevation at 21 with the horizon indication shown at the junction 22 of the shaded and unshaded portion of the ball within the instrument. The position of this horizon relative to the major transverse axis of the attitude gyro or gyro horizon is normally manually controlled by a knob 23 to move the horizon indication to coincidence with the major transverse axis for a desired angle of attack for the aircraft in which the instrument is disposed. According to the present invention, the position of knob 23, or the shaft which it moves, is automatically controlled in response to the angle of attack of the aircraft so that the position of the horizon line relative to the major transverse axis of the instrument will indicate to the pilot the dive angle of aircraft.

The angle of attack vane, indicated at 24, is mechanically coupled to the rotor of a rotary transformer of the self-synchronous transmitter-receiver type indicated at 25, the rotor winding being shown at 26. The three-phase stator winding 27 of the transformer 25 is connected to the stator winding 28 of a second rotary transformer 29 of the self-synchronous transmitter-receiver type whose rotor winding is indicated at 31. The rotor of winding 31 is mechanically connected to the rotor of a motor 32, which rotor is also mechanically connected to drive the shaft of knob 23 of the attitude gyro or gyro horizon. The output of winding 31 is fed through an amplifier 33 to one phase 34 of the motor 32, the second phase 35 being fed from the supply.

As in the device of Figure 1 the energization of motor 32 is determined by the position of the winding 31 relative to the null point of the stator winding 28, the energization of the stator winding 28 being determined by the output of stator winding 27 which is in turn determined by the position of the rotor winding 26 controlled by the angle of attack vane 24. The attitude gyro or gyro horizon is, of course, conventionally stabilized as a gyroscopic vertical and the position of the horizon line 22 moves in a vertical direction with change in the fore and aft attitude or pitch angle of the aircraft. As the angle of attack of the aircraft changes, it will effect rotation of the motor 32 to rotate the shaft of knob 23 to move the horizon line 22 also in a vertical direction. The resulting indication in the instrument is the algebraic sum of the pitch angle and angle of attack so as to indicate to the pilot of the aircraft, by the position of the horizon line 22, the dive angle of the aircraft.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. Dive angle responsive means for aircraft comprising means responsive to the fore and aft attitude of the aircraft, a first control element operable by said first mentioned means, means responsive to the angle of attack of the aircraft, a second control element operable by said second mentioned means, and an indicator operable additively by said first and second elements and indicating the angle between the flight path of the aircraft and the horizontal.

2. Dive angle responsive means for aircraft comprising gyroscopic means responsive to change in the fore and aft attitude of the aircraft, a first control element operable by said first mentioned means, means responsive to the angle of attack of the aircraft, a second control element operable by said second mentioned means, and means for algebraically adding the response of said gyroscopic means and angle of attack responsive means and indicating the angle between the flight path of the aircraft and the horizontal.

3. In a dive angle indicator for aircraft, means responsive to the fore and aft attitude of the aircraft, means responsive to the angle of attack of the aircraft, and indicating means operable additively by both said responsive means for indicating the angle between the flight path of the aircraft and the horizontal.

4. In a dive angle indicator for aircraft, gyroscopic means stabilized with respect to the fore and aft attitude of the aircraft, a control element operable in response to the angle of the gyroscopic means with respect to said fore and aft attitude, means responsive to the angle of attack of the aircraft, a control element operable by said means and indicating means controlled by the combined action of said two control elements for indicating the angle between the flight path of the aircraft and the horizontal.

5. In a dive angle indicator for aircraft, gyroscopic means stabilized to be responsive to change in the fore and aft attitude of the aircraft, a vane adapted to be disposed in the air stream to assume a position parallel to the angle of attack, control elements independently operable by said gyroscopic means and by said vane; and an indicating member operable additively by said control elements and indicating the angle between the flight path of the aircraft and the horizontal.

6. In a dive angle indicator for aircraft, a rotary transformer whose output is determined by the position of the rotor winding, gyroscopic means responsive to change in the fore and aft attitude of the aircraft for controlling the position of said rotor winding, a second rotary transformer, means for energizing said second rotary transformer from the output of said first rotary transformer, angle of attack responsive means controlling the position of the rotor winding of said second rotary transformer whereby the output of said second rotary transformer is the algebraic sum of the responses of said gyroscopic means and angle of attack responsive means, and means controlled by the output of said second rotary transformer for indicating the dive angle of the aircraft.

7. In a dive angle indicator for aircraft, a gyroscopically controlled device for indicating an artificial horizon movable vertically upon change in the fore and aft attitude of the aircraft, means responsive to the angle of attack of the aircraft, and means for adjusting the position of said artificial horizon in accordance with the response of the angle of attack responsive means.

8. In a dive angle indicator for aircraft, a gyroscopically controlled device for indicating an artificial horizon movable vertically upon change in the fore and aft attitude of the aircraft, means responsive to the angle of attack of the aircraft, and means for moving said artificial horizon vertically upon change in the angle of attack of the aircraft, said last mentioned means adding the angle of attack movement of the artificial horizon algebraically to the movement thereof caused by change in the fore and aft attitude of the aircraft whereby the position of the artificial horizon indicates the angle between the flight path of the aircraft and the horizontal.

JOHN H. ANDRESEN, Jr.

References Cited in the file of this patent

UNITED STATES PATENTS

| Number | Name | Date |
|---|---|---|
| 1,384,867 | Sperry | July 19, 1921 |
| 1,896,805 | Sperry et al. | Feb. 7, 1933 |
| 2,458,586 | Giroud | Jan. 11, 1949 |
| 2,467,179 | Andresen | Apr. 12, 1949 |

FOREIGN PATENTS

| Number | Country | Date |
|---|---|---|
| 626,635 | Great Britain | Dec. 26, 1944 |

OTHER REFERENCES

Article by F. Postlethwaite, "An Italian Artificial Horizon" in Aircraft Engineering, October 1944, pages 288 and 289.